United States Patent [19]

Maxfield et al.

[11] Patent Number: 4,787,169
[45] Date of Patent: Nov. 29, 1988

[54] LIVE BAIT CONTAINER

[76] Inventors: Kathryn V. Maxfield; Roger L. Nelson, both of 9232 Massot Ave., Santee, Calif. 92071

[21] Appl. No.: 148,280

[22] Filed: Jan. 25, 1988

[51] Int. Cl.$^4$ ............................................. A01K 97/04
[52] U.S. Cl. ......................................................... 43/57
[58] Field of Search ............................. 43/55, 56, 57; 261/121.2

[56] References Cited

U.S. PATENT DOCUMENTS

| 2,626,791 | 1/1953 | Lefevre | 43/57 |
| 2,734,305 | 2/1956 | Hannah | 43/56 |
| 2,736,983 | 3/1956 | Hostetter | 43/57 |
| 2,777,241 | 1/1957 | Mullins | 43/56 |
| 3,334,438 | 8/1967 | Fellers | 43/56 |
| 3,710,502 | 1/1973 | Bracey | 43/56 |
| 4,162,681 | 7/1979 | Patterson | 261/121.2 |

Primary Examiner—M. Jordan
Attorney, Agent, or Firm—Frank D. Gilliam

[57] ABSTRACT

A container for maintaining live bait comprising a central bait holding portion, a readily accessible bait holding portion and a continual source of fresh water compatible with the natural environment of the bait which is supplied to the central bait holding portion and the readily accessible bait holding portion. The central holding portion can have any general configuration and the readily accessible portion is shaped to generally resemble a circular concave trough with a central aperture therethrough. The aperture allows bait to be manually transferred by net or scoop from the central portion to the readily accessible portion in small quantities for baiting hooks or chumming. Valve and tubing provides water to the central portion and selectively to the readily accessible portion. An over flow tube maintains the proper water level within the container.

7 Claims, 1 Drawing Sheet

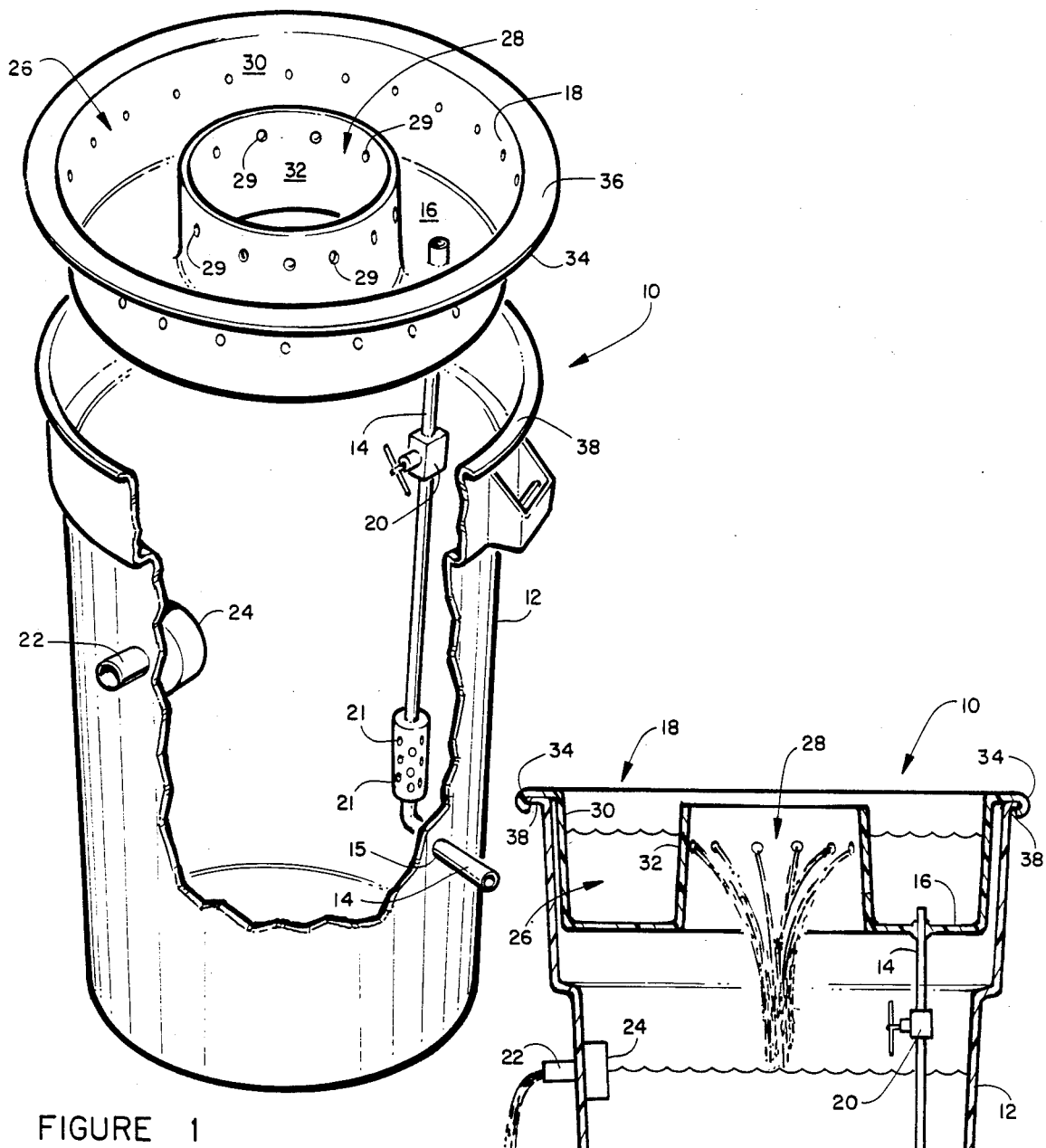
FIGURE 1
FIGURE 2
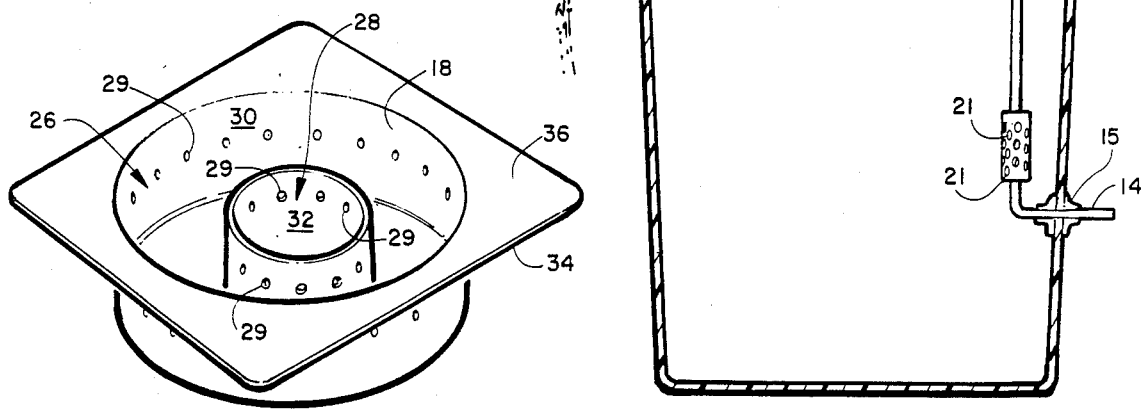
FIGURE 3

LIVE BAIT CONTAINER

BACKGROUND OF THE INVENTION

1. Field of the Invention

This invention relates to the maintaining of live bait for use in sport fishing and the like, and more specifically to a live bait container where the principle or large capacity bait storage is separated from a small bait storage area for immediate use to prevent undesirable contact with the large quantity of stored bait to extend bait life and maintain the bait in a natural appearing condition as long as possible.

2. Description of the Prior Art

Aerated live bait tanks are well known for maintaining bait in a live condition for sport and commercial fishing. The following U.S. Patents are directed to such known devices:

U.S. Pat. No. 2,767,509, D. E. Breithaupt, Oct. 23, 1956

U.S. Pat. No. 3,509,657, O. C. Bross, Jr., May 5, 1970

U.S. Pat. No. 3,800,462, Charles Ray Coyl, Apr. 2, 1974

U.S. Pat. No. 4,037,349, James A. Key, July 26, 1977

U.S. Pat. No. 4,677,785, Robert G. Lambourn, July 7, 1987

Generally stated it can be said that these prior art live bait container all have at least one undesirable feature, namely, all of the bait supply is subject to damage any time bait is desired and removed from the container regardless of how many of the bait is needed and removed at any given time. For example, if a hundred or more individual live bait are contained in the container each time the fisherman requires an individual live bait the fisherman must reach into the container with a scoop or net to remove the needed bait. The retrieving means whether a scoop or net brushes against many of the bait in the container causing some damage to these contracted however so slight. Continual contact with the bait not yet ready to be used by the fisherman causes injury or death which renders them useless for their intended purpose. It should be understood that when the fisherman desires only one of the bait the scoop or net will generally capture more than just one resulting in the excess being dumped back into the container for latter use. This action causes severe damage to the bait even greater than the contact and non-removal of the bait by the scoop or net.

There has not been a suitable live bait container to extend the usable life of contained live bait until the emergence of the instant invention.

SUMMARY OF THE INVENTION

The live bait container of the present invention is configured to provide a central bait holding container where the principal live bait are contained and a subordinate container where a smaller quantity of live bait can be maintained for immediate use without disturbing the principal supply. A continually changing supply of water either salt or fresh depending on the requirement of the live bait is supplied to the principal live bait container and selectively supplied to the subordinate container when live bait is present therein. An overboard drain maintains the proper water levels within one or both containers. The principle bait container can take any desirable shape, for example tubular, conic, truncated, rectangular, etc. Generally any shape that is desired or required by the configuration of the boat or other supporting medium can be utilized. The subordinate container, the upper most container, has the general shape of a concave circular trough with a central opening, not unlike the shape of an angel food cake pan. The subordinate container is positioned over the principle container so that a scoop or net can be inserted through the central opening or aperture therethrough for obtaining a small quantity of live bait therefrom for immediate use with the excess being deposited in the circular trough rather than being returned to the central container, as is taught by the prior art, for the next immediate use. A continuing supply of fresh water is supplied to both the principle container and the subordinate container from a pump or the like well known in this art. Initially the principle container is allowed to be filled with water and the live bait are then placed therein. During this operation a valve between the circulating water supply and the subordinate container is closed as there is initially no live bait therein at this time and none will be placed therein until the fisherman has reached the fishing grounds which is generally remote from the source of live bait. This non filing of the subordinate container prevents splashing of the water therefrom during transit of the live bait container.

When the fishing grounds are reached, the valve is opened allowing water to enter the trough of the subordinate container. The inner and outer trough surfaces contain at least one row of drain apertures leading to the principal container for maintaining a selected water level in the trough. When the trough has filled to the desirable, level a scoop or net is manually inserted through the central aperture in the subordinate container and a desired quantity of live bait is removed therefrom and deposited within the trough. The fishing person or persons then takes the live bait as required to bait a hook or hooks or chum from the trough. In this manner the principal supply of live bait is only disturbed when the subordinate supply of live bait is exhausted which will be at extended intervals rather than each time a live bait is required as in the present art.

An object of this invention is to be able to maintain a principle supply of live bait in a minimum disturbed condition for an extended period of time while fishing in a normally expected manner using live bait from a subordinate container originally taken from the principle supply for that extended period of time.

Another object of this invention is to provide a live bait container in which the water level in a subordinate container can be selectively controlled independent of the water level in a principle container.

Still another object of this invention is to provide an improved live bait container that is reliable, economical, simple, and of durable construction.

These together with other objects and advantages will become subsequently apparent reside in the details of construction and operation as more fully hereinafter described and claimed, reference being had to the accompanying drawings forming a part thereof, wherein like numerals refer to like elements or parts throughout.

BRIEF DESCRIPTION OF THE DRAWING FIGURES

FIG. 1 is a perspective showing of the live bait container of the invention partially exploded and cutaway to expose principle elements thereof;

FIG. 2 is a side cutaway showing of FIG. 1; and

FIG. 3 is a second embodiment of the upper subordinate live bait container of FIG. 1.

DETAILED DESCRIPTION OF THE PREFERRED EMBODIMENTS

Referring now specifically to the drawing Figures, FIG. 1 depicts an exploded partially cutaway showing of the live bait container 10 of the invention and FIG. 2 depicts a cut away showing of the FIG. 1 showing. A main or principle container 12 is provided a continuous flow of water, either fresh or salt depending on the requirement dictated by the type of live bait to be maintained, from a supply input tube 14. The supply input tube 14 extends upwardly from its sealed entry into the principle container at 15 through the bottom surface 16 of an upper or subordinate container 18. An on/off control valve 20 is positioned near the distal end of the supply input tube 14 to control the flow from the input supply tube to the subordinate container 18. Intermediate the on/off control valve and the sealed entry at 15 is a plurality of perforations 21 admitting the water into the principle container. An overboard drain 22 is located near the top of the principle container. The drain input includes a screen 24 to prevent the live bait from exiting the principle container.

The upper or subordinate container 18 includes a circular trough area 26 for containing a small amount of live bait. Centrally positioned within the trough area is an aperture 28 sufficient in diameter to allow a scoop or small net to be inserted therethrough. A row of small apertures 29 are positioned around the outer and inner wall surfaces 30 and 32 respectfully of the upper or subordinate container 18. These apertures are of equal dimension and are employed to maintain a predetermined water level in the subordinate container 18. A lip 34 (see FIG. 2) around the distal edge of the upper outer surface 36 of the upper or subordinate container grips the upper lip 38 of the principle container 12 and maintains the two containers integral during use.

The water is supplied to tube 14 under pressure via a water pump not shown, which is well known in this art. Any suitable source of water under pressure can be employed to practice this invention.

Any materials of construction suitable for the purpose intended of the invention can be utilized in construction thereof. It has been found that large plastic containers such as, but not limited to, 55 gallon trash containers are suitable. The upper or subordinate container can be constructed from the same material as the principle container. The exit drain may be constructed of PVC tubing or the like as can the inlet tube 14. The valve can be likewise constructed of plastic or the like. It should be pointed out that although the components of invention can be constructed of various materials that material must not be toxic to the live bait to be placed therein for obvious reasons.

Referring now specifically to FIG. 3, in this embodiment of the upper or subordinate container the outer rim is rectilinear in plan rather than curvilinear as shown in FIG. 1. This allows the upper or subordinate container to be utilized with a principle container of rectilinear configuration if desired.

Although the two containers have been described herein as two separate units, a single integral unit having two separate containers could be used to practice this invention.

OPERATION OF THE INVENTION

As noted above, the invention is directed to a live bait container for use in fishing. When a fishing trip is contemplated and live bait is to be used, the principle container connected to a source of either salt or fresh water under pressure is filled therewith. During the filling and prior to the container's actual use at the fishing grounds the valve 20 is closed thereby preventing water from entering the upper or subordinate container. The principle container is now filled with water to the drain level and with the desired live bait, types of live bait used by fisherman are well known in the art and, therefore, specific types will not be discussed herein. After reaching the fishing grounds, the valve 20 is opened causing water to exit the distal end of the tube 14 filing the upper or subordinate container 18 to a level controlled by the level of the apertures 29. When the upper or subordinate container is filled the fisherman inserts either a dip net or a scoop through the aperture 28 obtaining a desired quantity of live bait therein. These live bait are then deposited into the trough area 26 for future use. Accordingly, until all of the live bait in the trough area is utilized the remaining live bait in the principle container will be unmolested and therefore unharmed for the period of time required to utilize all of the live bait in the trough area.

While the invention has been disclosed and described in some detail in the drawings and the foregoing description, they are to be considered as illustrative and not restrictive in character, as other modifications may readily suggest themselves to persons skilled in this art and within the broad scope of the invention.

What is claimed is:

1. A live bait container comprising:
    a first principle container for containing a large quantity of live bait therein;
    a second removable subordinate container for containing a small quantity of said live bait taken periodically from said first container, said second container having an open circular trough as its upper surface with an aperture therethrough, said second container being positioned as a cover for said first container with said aperture therethrough providing an opening into said first container;
    conduit means extending from a source of water under pressure for supplying water to said first container and selectively to said second container; and
    means for independently maintaining preselected levels of water in said containers.

2. The invention as defined in claim 1 wherein said first principle container is a conic plastic container.

3. The invention as described in claim 1 additionally comprising a means for removable locking said second container to said first container for forming an integral unit.

4. The invention as defined in claim 1 wherein said means for maintaining a preselected level of water in said second container comprises a plurality of drain apertures around at least the inner wall of said trough of said second container.

5. The invention as defined in claim 1 wherein said apeture through said second container is circular and is centrally positioned adjacent said open circular trough.

6. The invention as defined in claim 1 wherein said means for selectively supplying water to said second container is controlled by valve means positioned within said first container.

7. The invention as described in claim 1 wherein said second container is selectively lockable to a rectilinear first container.

* * * * *